: # 3,079,260
VITAMIN K ANIMAL FEED PREMIX
William Galler, 986 Wateredge Place,
Hewlett Harbor, N.Y.
No Drawing. Filed Oct. 12, 1959, Ser. No. 845,624
14 Claims. (Cl. 99—2)

This invention relates to an improved vitamin K animal feed premix, especially a poultry feed premix, in which the vitamin K active material is substantially more stable with the passage of time than in premixes heretofore available.

Since its use eliminates hemorrhagic disease in chickens and turkeys, vitamin K fortification of poultry feed is now a generally accepted practice. The vitamin K active compounds with which the present invention is concerned are the bisulfite adducts of menadione, i.e., 2-methyl-1,4-naphthoquinone, referred to herein as menadione bisulfite adducts, or simply "MBA." The salt may be an alkali metal, alkaline earth metal, ammonium or amine salt. These bisulfite salts are water soluble and the salt in most common use is menadione sodium bisulfite, referred to herein as "MSB."

Since only a very small quantity of MBA is required to produce the desired result, it is difficult to obtain uniform distribution of the material in the feed. The common practice is to first prepare a concentrated dilution of the vitamin K active material which is added to the complete feed as the latter is prepared. The first dilution of the vitamin K is referred to in the trade as a "premix," and it has been the practice to use a premix containing about 4 grams of vitamin K active material per pound. One-quarter pound of this premix is then mixed with other ingredients to form a ton of complete chicken feed. About three-quarters pound per ton is employed in turkey feed. Multiple strength premixes are also in demand, for example, those containing 8, 12, 16, 24, 32 and 64 grams of the vitamin K active material per pound of premix. These multiple strength premixes are necessary to accommodate the varied formulating practices resorted to by the feed mills, but in substantially all cases the complete poultry feed will contain about 1 to 20 grams per ton of MBA.

The material with which the MBA is diluted to form the premix is referred to herein as the carrier. This material should be one which is both inexpensive and inert, and must be one which is tolerated by the animal. A preferred carrier is calcite flour, which is a mineral supplement. Nutritive materials, such as soybean meal, are currently finding wide acceptance as carriers. The following list contains but a few of the nutritive materials which have or may be employed as the carrier.

Corn meal
Corn cob meal
Milo
Soybean oil meal
Alfalfa meal
Dried whey
Wheat shorts
Distillers' dried solubles
Salt
Meat scraps
Butyl fermentation solubles
Feather meal
Poultry by-products
Wheat middlings
Dextrose
Lactose meal
Dried kelp
Linseed oil meal
Oatmeal
Dried yeast
Wheat bran For purposes of simplicity, the present invention will be described as applicable to a typical alkaline carrier, calcite, and a typical acid-reacting nutritive carrier, soybean meal, although it is to be understood that the stabilized premix of this invention is not limited to the particular carrier material employed.

It had been generally accepted that the MSB premixes, among them calcite premixes, were quite stable and the MSB retained its vitamin K potency over long periods of time. However, with the advent of improved analytical and measuring techniques this has been disproved. For example, commercially available MSB calcite premixes assayed every month for a period of ten months were found at the end of the period to have a vitamin K potency equal to only about 50% as compared with that of the premix at the time of its preparation. Samples of commercial MBA calcite premixes obtained from feed mills throughout the United States and analyzed for vitamin K potency revealed that the premixes stored in warmer, more humid climatic areas had a considerably lower vitamin K potency than those from cooler, drier areas. It was further observed that the premixes which had lost their vitamin K potency were generally, although not always, pink in color, whereas the freshly prepared premix is normally white or slightly grey.

Thus it can be seen that the feed manufacturer cannot be certain of the vitamin K potency of the premix which he is employing. If the color has changed from white to pink, it is reasonable for him to suspect that potency is reduced, but without complicated chemical analyses he cannot be certain of the degree of decomposition of the MBA. Accordingly, a vitamin K premix of improved stability with the passage of time would be highly desirable.

While moisture has been found to have a direct bearing upon the loss of potency of an MBA calcite premix, its adverse effect upon the vitamin K material is very marked in the presence of air or oxygen. Samples of MSB dissolved in water, i.e. not in contact with air, exhibited only insignificant losses of vitamin K potency with the passage of time at elevated temperature. Apparently moisture in the form of water-vapor in the presence of air in contact with an MBA calcite premix enables hydrolysis of small quantities of calcite and possibly also some MBA, with the production of enough hydroxyl ions to cause alkaline decomposition of the MBA.

I have conducted a series of tests to determine the stability of both menadione and menadione sodium bisulfite containing excess sodium bisulfite in water at room temperature at various pH levels. The results indicate that MSB is considerably less stable than menadione above a pH of about 6, but is more stable in the range of pH 4–6. The greatest stability of the sodium bisulfite adduct is between about pH 4 and 6.5. For example, after 21 days at room temperature vitamin K potency was 98%, at pH 4.0 and at pH 6.4 it was only 65%, while at pH 7.7 potency was 31%. Potency was completely destroyed at pH 10 after 21 days. There is some loss in potency even between pH 4 and 6. For example, potency was 82% at pH 5 and 79% at pH 5.5. Thus, while MSB is less stable in alkaline than in acidic media, it is also subject to acid decomposition. However, from my observations it is apparent that this vitamin K active material is more stable in water under slightly acid conditions, specifically pH 4 or slightly less to 6 or 6.5, than at higher pH.

Since calcite is an alkaline reacting material, and since MBA is more stable under acid conditions, an obvious expedient would appear to be the choice of a carrier which would yield an acidic extract with moisture. However, MSB is, as noted above, also subject to appreciable acid decomposition and gradually loses potency even on an acidic carrier such as soybean meal.

In accordance with the present invention, I have found that the initial vitamin K potency of the premix can be stabilized to a great extent and deterioration with time and in the presence of moisture and air, i.e., relatively high humidity, can be greatly inhibited by incorporating in the premix an acid reacting material which produces a more acidic water extract. That is to say, when a sample of premix containing the weakly acidic material is extracted with a quantity of water, the pH of the resulting extract is lower than the pH of the extract of the premix which does not contain the acidic material. The weakly acidic material is desirably a salt of a weak base and a strong acid, or a weak organic acid or organic salt. In addition to its ability to inhibit decomposition of MBA in the premix, the stabilizer preferably serves another purpose in the ultimate feed. It is, for example, a mineral or nutritional factor or supplement, as set forth hereinafter. A stabilizer must of course be chosen which will not be harmful to the poultry in the amounts employed.

In the case of calcite premixes, it is also within the scope of the present invention to employ as a stabilizing material a salt other than of a strong acid and a weak base or a weak organic acid or organic salt; namely, a calcium salt which is more soluble than calcite. Apparently, the calcium salt of the latter type through common ion effect suppresses the solubility of calcite, which is only very slight, thus preventing hydrolysis and the availability of hydroxyl ions.

The preferred inorganic stabilizer of the present invention is monocalcium phosphate, and for purposes of simplicity the majority of tests reported herein are in connection with the use of this material. However, as pointed out hereinafter, other salts, both organic and inorganic as well as organic acids may be employed.

While the manner in which the stabilizing material inhibits decomposition of MBA, for example, is not precisely known, I would offer the following possible explanation of the stabilizing action of monocalcium phosphate upon an MSB calcite premix.

As a dry mixture of MSB calcite premix becomes moist due to absorption of atmospheric moisture, an amount of calcium carbonate indicated by its solubility product is solubilized with resulting hydrolysis and the formation of hydroxyl ions. The hydroxyl ions then react with the MSB, causing its alkaline deterioration. Differences in the degree of destruction were noted with different samples of MSB calcite premixes made at different times and containing varied amounts of moisture. The quantity of potential hydroxyl ions in a given weight of such a premix remains the same, but the quantity of moisture that the premix will pick up varies with atmospheric moisture content from day to day, and accordingly also the quantity of hydroxyl ions will vary.

A premix containing monocalcium phosphate as the stabilizer, is also solubilized by moisture with the production of acidic phosphate ions, which interact with the hydroxyl ions from the solubilization of calcium carbonate. While this interaction removes both phosphate and the hydroxyl ions, with increased moisture further dissolution occurs and there is a continuous increase in the supply of hydroxyl and phosphate ions available. The process could continue with added moisture until one or the other materials, calcium carbonate or monocalcium phosphate, is exhausted. The equivalence point will be reached when the monocalcium phosphate content is equal to twice the number of mols of calcium carbonate present. Theoretically then, since the reaction is a monomolecular one, the maximum amount of monocalcium phosphate necessary for each 200 parts of calcite is 252 parts. Of course, in practice the MSB calcite premix never is so wetted as to require this theoretical maximum ratio of materials.

The average shelf time for the vitamin K premix from its time of manufacture to the time of use by the feed formulator varies on the average from about 2 to 4 months, although in many instances the material is stored for considerably longer periods at the warehouse or at the feed mill. Through analysis of a series of ten commercially available MSB calcite premixes, containing approximately 4 grams MSB per pound, stored for periods of 3 to 10 months in the usual manner, I have observed that the menadione content of the premix, i.e., the vitamin K active material, deteriorates at a rate which varies between about 5 and 17 mg. per day. I have also observed that the rate of deterioration and consequent loss of vitamin K potency is not as pronounced with either calcite or soybean meal carriers when the premix contains larger quantities of MSB, for example, 8, 16, 32 and 64 grams per pound of premix. In the case of calcite at least, this is presumably due to the fact that only a given quantity of calcite is solubilized by the moisture present, releasing a given quantity of hydroxyl ions which are presumably capable of deteriorating only a given quantity of MBA.

It will be appreciated that potency tests conducted on premixes which have been stored at room temperature and high relative humidity for long periods of time are the most reliable since the material is permitted to deteriorate in a natural manner. However, periods of time ranging from about two months to a year are necessary before the final assay can be made. Accordingly, it is desirable to accelerate the aging process and this is accomplished by steaming a sample of freshly prepared premix, or a commercially available premix of known date of manufacture, for a period of 30 seconds at 7½ pounds per square inch steam pressure. It is well known that normal aging may be accelerated by increased temperature, and since moisture plays an important role in the decomposition of MBA, elevated temperature and steam are indeed a drastic acceleration of normal aging. It is believed that the 30 second steaming at 7½ pounds pressure is equivalent to at least one year at room temperature and a relative humidity of about 70%.

Another aging test has also been employed in which the sample of MBA premix is placed in a porous cloth bag and suspended in an enclosured air space maintained at 45° C. and 100% relative humidity. After 40 hours in this atmosphere the samples are removed and analyzed. This test is more drastic than 30 second steaming with a calcite premix due to availability of moisture for long periods as evidenced by lower potency figures, but is substantially equivalent to steaming with a soybean meal carrier premix.

In the stability tests reported herein, the premix was prepared by the addition of the MSB and the stabilizer, where employed, to a quantity of carrier sufficient to produce a one pound premix. A sample of the premix, specifically 15 grams thereof, where the premix contained 4 grams of MSB, was stirred with 100 ml. of water at about 20° C. The insoluble material was filtered off and the pH of the filtrate determined. A premix sample was assayed and the percent of menadione determined. In the case of premixes containing more than 4 grams of MSB, for example 8 grams, a 7½ gram sample was extracted with 100 ml. of water, etc.

The sample was then aged under normal or accelerated conditions and a similar sample of the aged material was extracted with the same quantity of water, pH determined, and a sample assayed for menadione. The percent retention of menadione indicates the vitamin K stability.

The following table shows the effect of the addition of 4, 8, 12 and 24 grams of monocalcium phosphate monohydrate to a typical 4 gram MSB calcite premix after storage for approximately three months at normal conditions of temperature and relative humidity.

*Table I*

CALCITE PREMIX—$CaH_4(PO_4)_2$ STABILIZER

| Ex. | MSB, g./lb. | Stabilizer, g./lb. | Original assay | | Aging time, weeks | Aged assay | | Vitamin K potency, percent retention |
|---|---|---|---|---|---|---|---|---|
| | | | Percent M | pH | | Percent M | pH | |
| 1 | 4.17 | ------ | 0.29 | 7.5 | 13 | 0.18 | 8.2 | 62 |
| 2 | 4.75 | 4 | 0.33 | 5.9 | 13 | 0.21 | 6.3 | 64 |
| 3 | 4.03 | 8 | 0.28 | 5.75 | 13 | 0.18 | 5.9 | 64 |
| 4 | 4.32 | 12 | 0.30 | 5.4 | 13 | 0.22 | 5.6 | 73 |
| 5 | 3.75 | 24 | 0.26 | 4.7 | 13 | 0.26 | 5.0 | 100 |
| 6 | 3.75 | 24 | 0.26 | 4.8 | 12 | 0.26 | 5.1 | 100 |

It will be noted that Example 1 retained only about 62% of its original Vitamin K potency and that the pH of a water extract of the sample increased from 7.5 to 8.2 after 13 weeks, thus indicating an increase in the hydroxyl ion content of the material. Examples 2 and 3 which contained 4 and 8 grams per pound of monocalcium phosphate, respectively, were definitely acidic before and after aging, but the stability of vitamin K was not substantially improved. In Example 4 which contained 12 grams of monocalcium phosphate there was approximately a 20% increase in potency after aging. With 24 grams of monocalcium phosphate, Examples 5 and 6, the vitamin K active material was completely stabilized.

In the above examples each premix contained approximately 4 grams per pound MSB and it is seen that more than 12, but perhaps less than 24 grams per pound of monocalcium phosphate was required to afford complete protection to the vitamin K active material. I have observed that the more concentrated the premix with respect to MSB the more stable the vitamin K active material, and that the quantity of MSB in the premix has little effect upon deterioration of this material with the passage of time in the presence of moisture. The more concentrated the premix, the less monocalcium phosphate is required to afford acceptable protection of the vitamin K active material. The following table shows the potency of premixes containing 16, 32 and 64 grams per pound MSB, respectively.

Table II
CALCITE CARRIER

| Ex. | MSB, g./lb. | Stabilizer CaH$_4$(PO$_4$)$_2$, g./lb. | Original assay Percent M | Original assay pH | Aging time, weeks | Aged assay Percent M | Aged assay pH | Vitamin K potency, percent retention |
|---|---|---|---|---|---|---|---|---|
| 7 | 16 | 4 | 1.03 | 6.3 | 8 | 0.85 | 7.0 | 82 |
| 8 | 32 | 4 | 2.14 | 6.6 | 8 | 1.97 | 7.3 | 92 |
| 9 | 64 | 12 | 4.25 | 5.5 | 8 | 4.14 | 6.9 | 97 |

It will be observed that Example 7 which contained 16 grams MSB and 4 grams monocalcium phosphate after 8 weeks had a potency of 80%, as compared with Example 2 (Table I) which contained 4.7 grams MSB and 4 grams monocalcium phosphate and had a potency of only 64% after 13 weeks. Thus it can be seen that the more concentrated premix deteriorates at a substantially slower rate. The same comparison may be made between Example 8 and Example 2. Example 9 which contained 64 grams MSB and 12 grams monocalcium phosphate was substantially completely protected, and yet Example 4 (Table I) which contained only 4.32 grams MSB, had a vitamin K activity after 13 weeks of only 73%.

It is thus seen that the more dilute the premix with respect to MSB, the more monocalcium phosphate stabilizer is required to effect substantially complete protection of the vitamin K active material, and this quantity generally will not exceed about 24 grams per pound with a calcite carrier. However, with a concentrated premix only 4 grams are required.

As noted above, the vitamin K active material in most general use is the water soluble menadione sodium bisulfite adduct. In most instances this material will contain excess sodium bisulfite, depending upon the controls exercised during its manufacture. For example, in order to be of U.S.P. quality the material should contain no free sodium bisulfite, but almost all commercially available products labelled MSB U.S.P. have been found to contain at least 2 to 3% excess sodium bisulfite, and in some instances the free salt may be present in amounts of up to about 30% by weight of the menadione adduct. This excess sodium bisulfite does not of itself exert any substantial stabilizing influence upon the MSB in the premix, and this is borne out by the following comparative tests, wherein sodium bisulfite was added to a protected and an unprotected premix.

Table III
[4 g. MSB calcite premix aged 14 weeks]

| Ex. | CaH$_4$(PO$_4$)$_2$, g./lb. | NaHSO$_3$, g./lb. | Original assay Percent M | Original assay pH | Aged assay Percent M | Aged assay pH | Vitamin K potency, percent retention |
|---|---|---|---|---|---|---|---|
| 10 | | | 0.275 | 7.5 | 0.144 | 8.4 | 52 |
| 11 | | 8 | 0.269 | 6.8 | 0.167 | 7.2 | 62 |
| 12 | 24 | 8 | 0.278 | 5.1 | 0.260 | 5.3 | 93 |
| 13 | 24 | | 0.264 | 4.7 | 0.235 | 4.8 | 89 |

While excess sodium bisulfite itself does not substantially inhibit decomposition of the MSB, potency is greatly improved by the addition of monocalcium phosphate to a premix containing a great excess of the bisulfite.

Attempts have been made to inhibit decomposition of MSB in a premix by isolating it from the carrier material. This is accomplished by coating finely divided particles of MSB with a water soluble material such as a vegetable gum. However, the resulting MSB coated granules are not substantially more stable after accelerated aging than MSB powder in a 4 gram MSB calcite premix, as evidenced by the tests reported in the following table.

Table IV
[4 g. MSB calcite premix steamed 30 seconds at 7½ p.s.i.]

| Ex. | MSB | CaH$_4$(PO$_4$)$_2$, g./lb. | Original assay, percent M | Aged assay, percent M | Vitamin K potency, percent retention |
|---|---|---|---|---|---|
| 14 | Powder | | 0.31 | 0.045 | 14 |
| 15 | do | 24 | 0.31 | 0.24 | 77 |
| 16 | Vegetable gum coated granule. | | 0.36 | 0.053 | 15 |
| 17 | do | 24 | 0.34 | 0.29 | 85 |

A comparison of Examples 14 and 16 shows that in an unprotected premix the vegetable gum coated MSB is no more stable than the uncoated material. However, upon the addition of 24 grams of monocalcium phosphate the vitamin K potency of both materials following steaming is improved five to six-fold, with the potency of the coated MSB protected with monocalcium phosphate being slightly higher than the uncoated MSB, although the protection afforded by the vegetable gum coating is only slight.

From the foregoing examples it is manifest that monocalcium phosphate affords a high degree of protection to MSB in a calcite premix. It has also been found that this preferred stabilizer also affords a high degree of protection to MSB in an acidic, nutritive carrier premix. The following series of tests conducted on a 4 gram wheat middlings premix show that at accelerated aging conditions monocalcium phosphate substantially improves the stability of the vitamin K active material.

Table V
[4 g. MSB wheat middlings premix steamed 30 seconds at 7½ p.s.i.]

| Ex. | MSB form | CaH$_4$(PO$_4$)$_2$, g./lb. | Original assay Percent M | Original assay pH | Aged assay Percent M | Aged assay pH | Vitamin K potency percent retention |
|---|---|---|---|---|---|---|---|
| 18 | Powder [1] | | 0.61 | 6.2 | 0.39 | 6.2 | 64 |
| 19 | do | | 0.41 | 6.9 | 0.29 | 6.8 | 71 |
| 20 | do | 24 | 0.42 | 5.1 | 0.34 | 5.2 | 81 |

[1] U.S.P.

A comparison of Examples 18 and 19 indicates that menadione sodium bisulfite U.S.P. is more prone to loss of vitamin K potency than is the commercially available MSB powder, which contains a slight excess of sodium bisulfite.

A further series of tests, reported in Table VI, show the improvement in potency retention afforded by the addition of monocalcium phosphate to a 16 gram MSB soybean meal carrier premix, as compared with a protected and an unprotected 16 gram MSB calcite premix.

material, the salt of relatively strong bases and a weak acid, and the potassium sulfate is a salt of a strong base and a strong acid. From the table it can be seen that these two salts accelerate rather than inhibit the loss of potency of MSB. On the other hand, calcium sulfate, Example 37, has a very substantial stabilizing ability, because it is a salt of a weak base and a strong acid. The

Table VI
[16 g. MSB premix steamed 30 seconds at 7½ p.s.i.]

| Ex. | Carrier | MSB form | $CaH_4(PO_4)_2$, g./lb. | Original assay | | Aged assay | | Vitamin K potency, percent retention |
|---|---|---|---|---|---|---|---|---|
| | | | | Percent M | pH | Percent M | pH | |
| 21 | Soybean meal | Powder | | 1.14 | 6.3 | 0.65 | 6.3 | 57 |
| 22 | do | do | 24 | 1.07 | 5.0 | 0.81 | 4.8 | 76 |
| 23 | do | veg. gum coated | | 1.09 | 6.2 | 0.72 | 6.0 | 66 |
| 24 | do | do | 24 | 1.06 | 5.0 | 0.91 | 4.5 | 86 |
| 25 | Calcite | Powder | | 1.14 | 6.8 | 9.11 | 8.5 | 10 |
| 26 | do | do | 24 | 1.01 | 4.9 | 0.81 | 6.3 | 80 |

It will be observed from a comparison of Examples 21 and 25 that in an unprotected condition MSB is vastly more stable with a soybean meal carrier than with a calcite carrier. Notwithstanding the increased stability of the vitamin K active material with soybean meal, its potency is improved at least 30% by the incorporation of monocalcium phosphate. As evidenced by Examples 25 and 26, monocalcium phosphate produced an eight fold improvement in potency retention in a calcite premix.

While monocalcium phosphate is a highly efficient inhibitor for stabilizing menadione sodium bisulfite in the premix, and preferred because of its relatively low cost, I have found that a wide variety of other acidic inorganic and organic salts and organic acids also stabilize MSB premixes. The following table reports the results of tests on a number of representative materials.

Table VII
[4 g. MSB calcite premix steamed 30 seconds at 7½ p.s.i.]

| Ex. | Stabilizer, 24 g./lb.) | Original assay | | Aged assay | | Vitamin K potency, percent retention |
|---|---|---|---|---|---|---|
| | | Percent M | pH | Percent M | pH | |
| 27 | | 0.278 | 7.3 | 0.068 | 9.2 | 24 |
| 28 | Monocalcium phosphate | .310 | 4.8 | .240 | 6.6 | 77 |
| 29 | Monopotassium phosphate | .276 | 5.9 | .055 | 6.9 | 20 |
| 30 | Monobasic ammonium phosphate | .282 | 5.9 | .081 | 7.3 | 29 |
| 31 | Hemisodium phosphate | .267 | 4.4 | .196 | 6.6 | 73 |
| 32 | Sodium acid pyrophosphate | .286 | 5.4 | .235 | 5.8 | 82 |
| 33 | Ferric pyrophosphate | .279 | 7.0 | .198 | 7.8 | 71 |
| 34 | Ferric orthophosphate | .283 | 7.0 | .181 | 7.3 | 64 |
| 35 | Trialuminum phosphate | .184 | 7.4 | .128 | 8.0 | 70 |
| 36 | Monomagnesium phosphate | .317 | 5.5 | .198 | 7.3 | 62 |
| 37 | Calcium sulfate | .281 | 7.7 | .163 | 9.2 | 58 |
| 38 | Calcium nitrate | .258 | 7.2 | .190 | 8.1 | 74 |
| 39 | Potassium pyrosulfate | .272 | 6.2 | .224 | 6.9 | 82 |
| 40 | Calcium glucuronate | .280 | 6.7 | .162 | 7.0 | 58 |
| 41 | 2-furoic acid | .286 | 6.2 | .200 | 7.6 | 70 |
| 42 | Calcium lactate | .262 | 7.2 | .096 | 9.0 | 37 |
| 43 | Calcium stearate | .262 | 7.7 | .088 | 8.7 | 34 |
| 44 | Sodium potassium tartrate | .267 | 8.8 | .016 | 9.1 | 6 |
| 45 | Potassium sulfate | .267 | 8.9 | .021 | 9.0 | 8 |

Also reported in Table VII are several materials which do not exhibit any appreciable stabilizing influence, for example, monopotassium phosphate and monoammonium phosphate. Examples 44 and 45, sodium potassium tartrate and potassium sulfate, respectively, were not calculated to have any appreciable stabilizing influence upon MSB. Sodium potassium tartrate is definitely an alkaline inhibiting ability of this material is in part at least apparently due to common ion effect, with the calcium ion from this slightly soluble salt depressing solubility and ionization of the calcite. This effect also contributes to the effectiveness of calcium nitrate, Example 38, which is a more soluble and a substantially better inhibitor than calcium sulfate. Common ion effect is also believed to explain the relatively good inhibiting properties of calcium glucuronate, lactate and stearate, Examples 40, 42 and 43, respectively.

The phosphate salts of Examples 31–36 are all satisfactory stabilizers, and especially sodium acid pyrophosphate. Potassium pyrosulfate is an excellent inhibitor, on a par with monocalcium phosphate.

In addition to the materials specifically mentioned in Table VII the ammonium, zinc, iron, aluminum and manganese salts of hydrochloric, nitric and sulfuric acid are also acceptable stabilizers for MSB premixes. Diabasic ammonium phosphate and acetyl salicylic acid may also be employed, as may many other compounds.

The preferred stabilizer, monocalcium phosphate, is a mineral supplement and upon inclusion of the thus protected MSB premix in the complete feed, the monocalcium phosphate serves this secondary purpose. I have found that certain nutritional factors and nutritional supplements which are employed in a complete poultry feed may also be employed to stabilize MBA in the premix. For example, both niacin and choline chloride exert a very substantial stabilizing influence upon MSB in calcite and soybean meal premixes. In the case of niacin, which is present in the complete feed in amounts between about 20 and 90 grams per ton, the entire quantity required may be introduced from a premix containing MSB, in which premix the niacin serves to substantially completely inhibit the deterioration of MSB.

A still further material which serves to effectively inhibit deterioration of MSB and also performs a useful function in the complete feed is terephthalic acid. It is not believed to be a nutritional supplement, but serves to potentiate or increase the broad spectrum antibiotic content of the blood. That is to say, it greatly improves the effectiveness of the broad spectrum antibiotics, for example, tetracycline and its derivatives. The soluble salts of terephthalic acid are at least as active as the free acid in potentiating oxytetracycline serum levels, and the soluble salts have also been found to exert a substantial stabilizing influence upon MSB in the premix.

The following table reports the results of tests which show the stabilizing influence of terephthalic acid, niacin and choline chloride upon an MSB premix.

Table VIII

[4 g. MSB premixes (0.278% M) steamed 30 seconds at 7½ p.s.i.]

| Ex. | Carrier | Stabilizer, g./lb. | CaH₄(PO₄)₂, g./lb. | Aged assay Percent M | Aged assay pH | Vitamin K stability, percent retention |
|---|---|---|---|---|---|---|
| 27 | Calcite | | | 0.068 | 9.2 | 24 |
| 28 | | Monocalcium phosphate | 24 | .240 | 6.6 | 77 |
| | | Terephthalic acid: | | | | |
| 46 | | 12 | | .170 | 7.1 | 61 |
| 47 | | 24 | | .221 | 6.7 | 79 |
| 48 | | 36 | | .207 | 6.5 | 75 |
| 49 | | 12 | 24 | .250 | 6.7 | 90 |
| 50 | | 24 | 24 | .245 | 6.4 | 88 |
| | | Niacin: | | | | |
| 51 | | 24 | | .250 | 6.9 | 90 |
| 52 | | 24 | 24 | .239 | 5.6 | 86 |
| 53 | Soybean meal | | | .205 | 6.4 | 74 |
| | | Terephthalic acid: | | | | |
| 54 | | 24 | | .211 | 5.7 | 76 |
| 55 | | 36 | | .200 | 5.7 | 72 |
| 56 | | 12 | 24 | .228 | 4.7 | 82 |
| 57 | | 24 | 24 | .229 | 4.6 | 82 |
| | | Niacin: | | | | |
| 58 | | 24 | | .229 | 5.0 | 82 |
| 59 | | 24 | 24 | .235 | 4.6 | 84 |
| | | Choline chloride: | | | | |
| 60 | | 25 | | .228 | 5.6 | 82 |
| 61 | | 25 | 24 | .248 | 4.0 | 89 |

In the case of terephthalic acid, a very substantial improvement in vitamin K potency following accelerated aging is evidenced by the inclusion of only 12 grams per pound in a calcite premix. On a soybean meal carrier 12 grams per pound is insufficient to inhibit decomposition of MSB, but some stabilization takes place with 24 grams. Referring to Examples 48 and 55 it will be seen that 36 g./lb. terephthalic acid did not further improve MSB stability.

Substantially better results were obtained with both calcite and soybean meal carriers by the inclusion of 24 grams of monocalcium phosphate in addition to the terephthalic acid. A similar but not such a marked improvement was noted in the case of choline chloride and niacin stabilized premixes.

It can be seen from Tables I, II, V and VI that the effect of the addition of monocalcium phosphate upon a calcite, wheat middlings or soybean meal carrier premix is to lower the pH of a water extract of the freshly prepared concentrate, and from Table I, the lower the pH the more stable the MSB. Preferably a stabilizer is chosen which will lower the pH of a water extract of a calcite premix to below about 6.5. In some instances, however, appreciable inhibition of loss of potency can be obtained with stabilizers which do not lower the pH below 6.5, as shown in Table VII. For example, calcium nitrate and trialuminum phosphate are both fair stabilizers.

The quantity of stabilizer required to effectively inhibit decomposition of the MSB will depend upon the concentration of MSB in the premix. The more concentrated the premix, the less stabilizer required, as evidenced by the above tests with a calcite premix. As a general rule at least 4 grams stabilizer will be employed per pound of premix, although stabilizing activity has been observed with the more strongly acidic stabilizers when present in amounts less than 4 grams per lb. Twenty-four grams per pound were employed in most of the above examples. A range of about 12–36 grams will adequately protect the very dilute as well as the concentrated premixes.

While the premix hereof has been described as one containing a carrier, a vitamin K active material and a stabilizer for the vitamin K material, a premix containing additional ingredients is of course within the scope of the present invention. Other feed additives may be incorporated in the premix, for example, mineral supplements, other vitamins or nutritional aids.

While the premix of this invention has been described as a poultry feed premix, it is to be understood it might also be used in the formulation of complete feeds for other animals, for example swine and cattle.

I claim:

1. A poultry feed premix consisting essentially of a calcite carrier, at least about 4 grams of menadione sodium bisulfite and at least about 4 grams of monocalcium phosphate per pound.

2. A poultry feed premix as set forth in claim 1 wherein the monocalcium phosphate is present in amount between about 12 and 36 grams per pound.

3. An animal feed premix consisting essentially of a soybean meal carrier, at least about 4 grams menadione sodium bisulfite and at least about 12 grams monocalcium phosphate per pound.

4. An animal feed premix consisting essentially of a solid carrier, a menadione bisulfite adduct and as an inhibitor therefor in said premix at least 12 grams per pound of terephthalic acid.

5. An animal feed premix consisting essentially of a solid carrier, at least 4 grams per pound menadione sodium bisulfite and as an inhibitor therefor in said premix at least 12 grams per pound of terephthalic acid.

6. An annual feed premix as set forth in claim 5 which also contains monocalcium phosphate.

7. An animal feed premix consisting essentially of a menadione bisulfite adduct, a solid carrier therefor and monocalcium phosphate present in said premix in amount sufficient to inhibit decomposition of the menadione bisulfite adduct therein.

8. An animal feed premix as set forth in claim 7 wherein the solid carrier is calcite.

9. An animal feed premix as set forth in claim 7 wherein the solid carrier is soybean meal.

10. An animal feed premix consisting essentially of a solid carrier, at least 4 g. per pound of a menadione bisulfite adduct and as inhibitors for said adduct in said premix at least about 12 g. per pound of terephthalic acid and at least about 4 g. per pound of monocalcium phosphate.

11. A vitamin K composition of improved stability of the vitamin K active material therein, consisting essentially of a menadione bisulfite adduct in amount of at least 4 grams per pound, a solid carrier therefor and at least 4 grams per pound of an acidic stabilizer for the menadione bisulfite adduct which inhibits decomposition of the menadione bisulfite adduct in the composition, the solid carrier being a material which normally promotes decomposition of the menadione bisulfite adduct in the absence of said acidic stabilizer, said composition constituting a vitamin K premix for combination with nutritional and supplemental feed components to form a complete animal feed.

12. A vitamin K composition as set forth in claim 11 wherein the acidic stabilizer is selected from the group consisting of terephthalic acid, choline chloride, niacin, 2-furoic acid, monocalcium phosphate, potassium pyrosulfate, and sodium acid pyrophosphate.

13. A vitamin K composition of improved stability of the vitamin K active material therein, consisting essentially of menadione sodium bisulfite in amount of at least 4 grams per pound, a solid carrier therefor and niacin present in said composition in amount of at least 4 grams per pound to inhibit decomposition of the menadione sodium bisulfite therein, the solid carrier being a material which normally promotes decomposition of the menadione sodium bisulfite in the absence of said niacin, said composition constituting a vitamin K premix for combination with nutritional and supplemental feed components to form a complete animal feed.

14. A vitamin K composition of improved stability of the vitamin K active material therein, consisting essentially of menadione sodium bisulfite in amount of at least 4 grams per pound, a solid carrier therefor and choline chloride present in said composition in amount of at least 4 grams per pound to inhibit decomposition of the menadione sodium bisulfite therein, the solid carrier being a material which normally promotes decomposition of the menadione sodium bisulfite in the absence of said choline chloride, said composition constituting a vitamin K premix for combination with nutritional and supplemental feed components to form a complete animal feed.

References Cited in the file of this patent
UNITED STATES PATENTS

| | | |
|---|---|---|
| 2,827,377 | Frost | Mar. 18, 1958 |
| 2,855,340 | Kent | Oct. 7, 1958 |
| 2,949,400 | Sieger et al. | Aug. 16, 1960 |